United States Patent
Michaud et al.

(10) Patent No.: US 9,509,749 B2
(45) Date of Patent: Nov. 29, 2016

(54) PROVIDING TRANSACTION IDENTIFIERS FOR APPLICATION PERFORMANCE MANAGEMENT IN DISTRIBUTED COMPUTER SYSTEMS

(71) Applicant: Teachers Insurance and Annuity Association of America, New York, NY (US)

(72) Inventors: Ethan Luke Michaud, Harrisburg, NC (US); Mathew Wade Pickering, Port Orange, FL (US); Janusz M. Juda, Natick, MA (US); Prabhu Purushothaman, Marlborough, MA (US); Thomas Steven Joyce, Washington, DC (US); William Val Arneth, III, Westborough, MA (US); Latrisha Devon Whitehead, Charlotte, NC (US); Matthew Maclean Bechard, Forestdale, MA (US); James Ronald Hixon, Waxhaw, NC (US); Jennifer D'Awn Jeffress, Lakewood, CO (US); Rafael Pedro Olaso, Mendon, MA (US); Gary Robert Couture, Hollis, NH (US); Louis Anthony Iannucci, Harrisburg, NC (US); Scott M. Blandford, Hopewell, NJ (US)

(73) Assignee: Teachers Insurance and Annuity Association of America, New York, NY (US)

( * ) Notice: Subject to any disclaimer, the term of this patent is extended or adjusted under 35 U.S.C. 154(b) by 113 days.

(21) Appl. No.: 14/254,566

(22) Filed: Apr. 16, 2014

(65) Prior Publication Data
US 2015/0304382 A1    Oct. 22, 2015

(51) Int. Cl.
*G06F 15/16*    (2006.01)
*H04L 29/08*    (2006.01)

(52) U.S. Cl.
CPC ........... *H04L 67/02* (2013.01); *H04L 67/1027* (2013.01); *H04L 67/142* (2013.01); *H04L 67/146* (2013.01)

(58) Field of Classification Search
USPC .................... 709/217, 218, 223, 224, 245
See application file for complete search history.

(56) References Cited

U.S. PATENT DOCUMENTS

| | | | |
|---|---|---|---|
| 6,360,270 B1 * | 3/2002 | Cherkasova | ........ H04L 41/5019 709/219 |
| 7,523,342 B1 * | 4/2009 | Fu | ......................... H04L 1/0045 714/4.12 |

(Continued)

OTHER PUBLICATIONS

ProtectWise™ Security Enlightened, "ProtectWise™ Cloud Network DVR", https://s3.amazonaws.com/www.protectwise.com/u/107/originatinal-pw-datasheet-v3.pdf, 2 pages, Last accessed on [Mar. 28, 2016].

(Continued)

*Primary Examiner* — Lan-Dai T Truong
(74) *Attorney, Agent, or Firm* — Lowenstein Sandler LLP (57) ABSTRACT

Systems and methods for providing transaction identifiers for application performance management in distributed computer systems. An example method may comprise: receiving, by a first computer system, a first message; identifying, based on a pre-defined byte pattern, an incoming transaction identifier within the first message; responsive to failing to identify the incoming transaction identifier, generating a new transaction identifier; transmitting, to a second computer system, a second message associated with the first message, the second message comprising a transaction identifier provided by one of: the incoming transaction identifier or the new transaction identifier; and transmitting, to a third computer system, a third message representing a log record, the third message comprising the transaction identifier.

17 Claims, 4 Drawing Sheets

(56) References Cited

U.S. PATENT DOCUMENTS

| 2015/0135325 | A1  | 5/2015 | Stevens et al. |
| 2015/0142874 | A1* | 5/2015 | He ............... H04L 67/02 709/203 |
| 2015/0244678 | A1  | 8/2015 | Stevens, IV et al. |

OTHER PUBLICATIONS

Report Reprint, "ProtectWise raises $20m series B to advance its futuristic security platform", https://s3.amazonaws.com/www.protectwise.com/u/182/original/451-impact-report-protectwise-raises-%2420m-series-o-to-advance-its-futuristic-security-platform.pdf, 5 pages, Dec. 1, 2015.

Nather, Wendy; Sanabria, Adrian, 451 Research, "ProtectWise's cloud-based network DVR for security, with echoes of TRON", https://s3.amazonaws.com/www.protectwise.com/u/183/original/451-research-report-protectwises-cloud-based-network-dvr-for-security-with-echoes-of-tron.pdf, 5 pages, May 29, 2015.

Palmer, Tony, et al., ESG Lab Spotlight, "ProtectWise: Shifting Network Security to the Cloud", https://s3.amazonaws.com/www.protectwise.com/u/70/original/esg-lab-spotlight.pdf, 5 pages, Mar. 2015.

ProtectWise™ Security Enlightened, "ProtectWise Advanced Trust, Security and Privacy by Design", https://s3.amazonaws.com/www.protectwise.com/u/49/original/protectwise-trust-security-privacy-whitepaper.pdf, 6 pages, Last accessed on [Mar. 28, 2016].

ProtectWise™ Security Enlightened, "ProtectWise Security Enlightened™ Defense in Depth? More Like Defence in Doubt™", https://s3.amazonaws.com/www.protectwise.com/u/83/original/protectwise-solutionsbrief-securityenlightened.pdf, 4 pages, 2015.

* cited by examiner

PROVIDING TRANSACTION IDENTIFIERS FOR APPLICATION PERFORMANCE MANAGEMENT IN DISTRIBUTED COMPUTER SYSTEMS

TECHNICAL FIELD

The present disclosure is generally related to distributed computer systems, and is more specifically related to application performance management in distributed computer systems.

BACKGROUND

A distributed computer system may comprise one or more components, including, e.g., web servers, application servers, database servers, and/or various other components. A plurality of clients may access the distributed computer system via a network comprising one or more local area networks and/or one or more wide area networks (e.g., the Internet). Performance and availability of the applications delivered by the distributed computer system may be monitored by an application performance management (APM) system that may collect, store, and process the data reflecting multiple performance and availability parameters of one or more components of the distributed computer system.

BRIEF DESCRIPTION OF THE DRAWINGS

The present disclosure is illustrated by way of examples, and not by way of limitation, and may be more fully understood with references to the following detailed description when considered in connection with the figures, in which.

DETAILED DESCRIPTION

Described herein are methods and systems for providing transaction identifiers for application performance management in distributed computer systems.

The term "application performance management" herein refers to the monitoring and managing of numerous performance metrics of software applications being executed by distributed computer systems. The application performance metrics may include various end user experience (EUE) metrics, such as the number of requests issued by a client within a given time period, the request processing time (e.g., measured as the page load time), and/or the number of server errors received in response to the client requests. The application performance metrics may further include various metrics related to usage levels of computing resources by a software application, such as the processor usage level, the amount of memory used by the application, and/or the amount of data transferred by the application over the network.

A distributed computer system may comprise one or more components, including, e.g., web servers, application servers, database servers, and/or various other components. A plurality of clients may access the distributed computer system via a network comprising one or more local area networks and/or one or more wide area networks (e.g., the Internet). A client request may trigger one or more chains of request-response interactions between numerous components of the distributed computer system. Identifying requests and responses belonging to various request-response chains triggered by particular user actions may be useful for associating various application performance metrics with particular user actions, and hence providing both holistic and focused views of the numerous application performance aspects.

The term "transaction" herein refers to a sequence of messages flowing between various components of a distributed computer system. Such a sequence may be triggered by a particular user action (e.g., requesting an object identified by a uniform resource identifier (URI) or submitting an HTML form). The present disclosure describes methods and systems for providing transaction identifiers in distributed computer systems. Various aspects of the methods and systems are described herein by way of examples, rather than by way of limitation. The methods described herein may be implemented by hardware (e.g., general purpose and/or specialized processing devices, and/or other devices and associated circuitry), software (e.g., instructions executable by a processing device), or a combination thereof.

Figure 1:
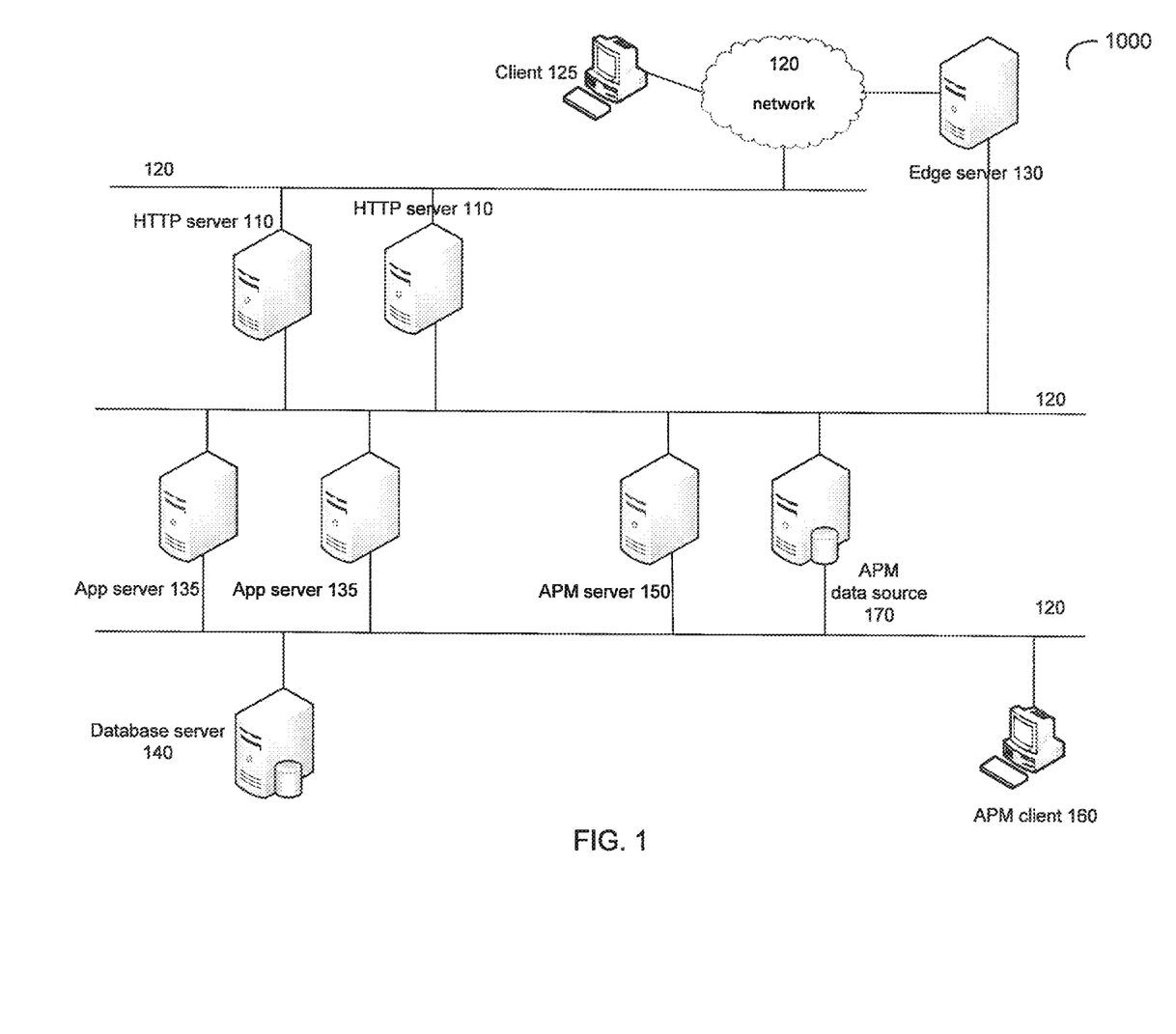
FIG. 1 schematically illustrates a high-level network diagram of an example distributed computer system, in accordance with one or more aspects of the present disclosure.

FIG. 1 schematically illustrates a high-level network diagram of an example distributed computer system 1000, in accordance with one or more aspects of the present disclosure. Firewalls, load balancers, network switches and various other components may be omitted from FIG. 1 for clarity. Computer systems, appliances, and network segments are shown in FIG. 1 for illustrative purposes only and do not in any way limit the scope of the present disclosure. Various other computer systems, components, appliances, and/or methods of their interconnection may be compatible with the methods and systems described herein for providing transaction identifiers for application performance management in distributed computer systems.

In an illustrative example, the distributed computer system 1000 may comprise one or more HTTP servers 110, which may be configured to receive, over one or more networks 120, requests from a plurality of geographically distributed clients 125. Networks 120 may comprise one or more local area networks and/or one or more wide area networks.

In certain implementations, a request initiated by client 125 may initially be routed to an edge server 130, which may then select, e.g., based on a load balancing scheme, an HTTP server 110 to which the client request should be routed. In addition to performing the load balancing, edge servers 130 may serve static content in response to client HTTP requests, and/or perform various other tasks.

In an illustrative example, a plurality of edge servers 130 may be geographically distributed so that a request initiated by client 125 would be routed to an edge server 130, which is selected based on the client geographic location and/or other request parameters. The edge server 130 may then forward the client-initiated request to a dynamically selected HTTP server 110. The latter may, upon parsing the request, issue one or more requests to one or more application servers 135. An application server 135 may process a request received from an HTTP server 110 and produce a response to be returned to the client computer system 125. The request processing by application server 135 may comprise issuing one or more requests to one or more database servers 140. The HTTP server 110 may then wrap the response produced by the application server 135 into one or more HTTP response messages and return the response messages to the client computer system 125 (e.g., via an edge server 130).

The above described client request processing serves as an illustrative example only and does not in any way limit the scope of the present disclosure. Various other client request processing components and/or methods may be compatible with the methods and systems for providing transaction identifiers for application performance management in distributed computer systems.

In certain implementations, the distributed computer system 1000 may further comprise one or more APM components, which may be represented by one or more software modules residing on one or more dedicated monitoring appliances and/or collocated with other functional components of the distributed computer system 1000. In an illustrative example, the APM components may include an APM server 150, an APM client 160, and an APM data source 170. The latter may be provided by file or block-level storage, relational databases, and/or data storage devices or systems of various other types.

In certain implementations, the distributed computer system 1000 may further comprise a data visualization subsystem (not shown in FIG. 1) designed to facilitate the visualization of the APM data by the APM client 160.

In an illustrative example, the network traffic monitoring within the distributed computer system 1000 may be performed using port mirroring by one or more network switches. The switches may implement port mirroring by sending a copy of network packets seen on one or more switch ports to a network monitoring appliance connected to a pre-defined switch port, which may be connected to the APM data source 170. In another illustrative example, agent-based monitoring may involve injecting JavaScript or other code modules to one or more servers and/or client computer systems, in order to determine transaction-specific response times at various layers of the distributed computer system 1000.

In certain implementations, agent-based monitoring within the distributed computer system 1000 may include configuring one or more servers, including edge servers 130, HTTP servers 110, application servers 135, and/or database servers 140, to insert transaction identifiers into the messages flowing between those servers, as described in more details herein below. The transaction identifiers may be employed for identifying requests and responses belonging to various request-response chains triggered by particular user actions.

Each server of a plurality of servers of the distributed computer system may be configured, responsive to receiving a request message from a client or from another server, to transmit a response message to the request originator and/or forward the request message to another server. In an illustrative example, an HTTP server may serve a static content responsive to a client request. In an illustrative example, an HTTP server may retrieve a dynamic content from an application server and then forward the retrieved dynamic content to the requesting client. In accordance with one or more aspects of the present disclosure, each server may be configured to insert a transaction identifier into the outgoing messages being transmitted by the server, unless such an identifier is already present in the corresponding incoming message.

In certain implementations, each server involved in the client request processing chain may be configured to ascertain whether an incoming message (e.g., an HTTP request) comprises a transaction identifier that has previously been inserted by other components of the distributed computer system. In an illustrative example, the transaction identifier may be packaged in an HTTP header (e.g., X-INFO header or a custom HTTP header), and hence may be recognized identifying a text pattern corresponding to the HTTP header within the HTTP request. In another illustrative example, the transaction identifier may be recognized based on other pre-defined byte patterns.

Responsive to determining that an incoming message comprises a transaction identifier, the server receiving the incoming message should insert the transaction identifier into one or more outgoing messages associated with the incoming message. In an illustrative example, an HTTP server may, responsive to receiving an HTTP request, build an HTTP response and insert the transaction identifier found in the HTTP request into an X-INFO header of the HTTP response, before transmitting the response back to the HTTP request originator. In another illustrative example, an HTTP server may, responsive to receiving an incoming HTTP request, build an outgoing HTTP request to be transmitted to an application server, and insert the transaction identifier found in the incoming HTTP request into an X-INFO header of the outgoing HTTP request, before forwarding the outgoing HTTP request to the application server.

Otherwise, responsive to determining that an incoming message does not comprise a transaction identifier, the server receiving the incoming message should generate a new transaction identifier and insert the generated transaction identifier into one or more outgoing messages associated with the incoming message. In certain implementations, the transaction identifier may be represented by a globally unique value (GUID). In an illustrative example, the transaction identifier may be represented by a 128-bit GUID, such as {9543EF67-2EC3-FFAD-3BB2-D29A65DB42EF}. In another illustrative example, the transaction identifier may be represented by a combination of a GUID and a server identifier, the latter identifying the server that generated the transaction identifier.

In certain implementations, the transaction identifier may be represented by a combination of a GUID and one or more various other identifiers (e.g., a session identifier, a user identifier, etc.). This can be particularly useful for transactions combining two or more different protocols at Open Systems Interconnection (OSI) model layer 4 (transport layer) and/or above OSI model layers, for example, for transactions combining TCP and non-TCP traffic, or HTTP and other application-layer traffic.

Responsive to building one or more outgoing messages associated with an incoming message, the server may further transmit a message comprising a log record to an APM data source. The logging message may comprise the incoming or newly generated transaction identifier. In an illustrative example, the logging message may comprise one or more outgoing messages. In another illustrative example, the logging message may mirror an outgoing message. In another illustrative example, a separate logging message may be transmitted for each outgoing message. In another illustrative example, the logging message may comprise an incoming message and/or one or more outgoing messages.

In another illustrative example, the logging message may comprise a subset of one or more outgoing messages.

In certain implementations, the logging message transmission may occur over a dedicated connection to the APM data source, in order to enable the real-time APM data collection and subsequent processing.

Figure 2:
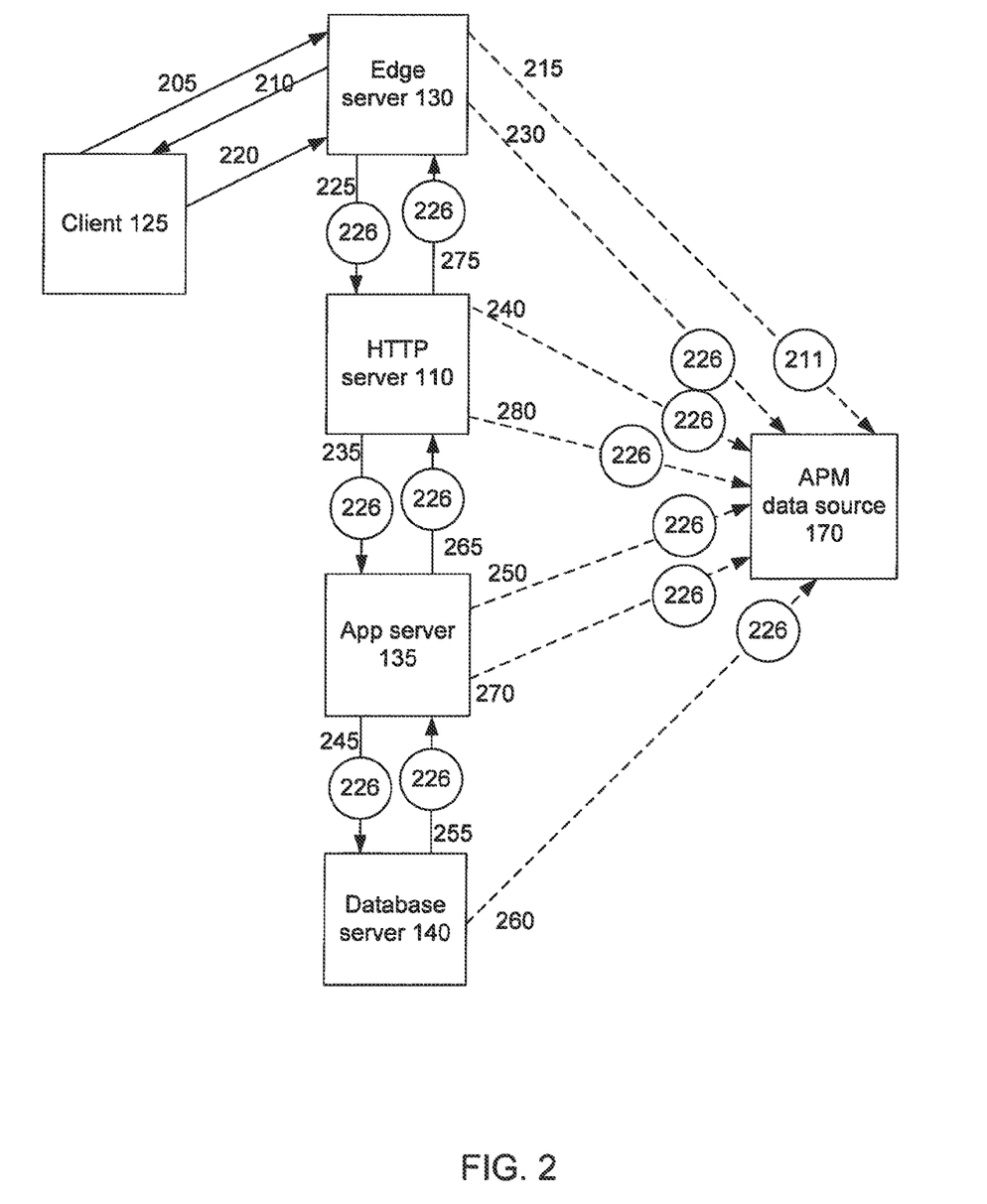
FIG. 2 schematically illustrates examples or request processing by the distributed computer system 1000 of FIG. 1, in accordance with one or more aspects of the present disclosure.

FIG. 2 schematically illustrates examples of request processing by the distributed computer system 1000 of FIG. 1, in accordance with one or more aspects of the present disclosure. In an illustrative example, a request 205 initiated by the client 125 may initially be routed to an edge server 130, which may be selected based on the client geographic location and/or other request parameters. If the requested content is static and/or cacheable, the edge server 130 may transmit a response message 210 incorporating the requested content back to the requesting client 125. The edge server 130 may also generate a new transaction identifier 211 and insert the generated transaction identifier 211 into a logging message 215, which the edge server 130 may transmit to the APM data source 170. The logging message may comprise at least part of the response message transmitted by the edge server 130 to the requesting client 125.

In another illustrative example, a request 220 initiated by the client 125 may be routed to an edge server 130. Responsive to determining that the requested content is not found in the cache, the edge server 130 may select, e.g., based on a load balancing scheme, an HTTP server 110 to which the client request should be forwarded. The edge server 130 may build an outgoing HTTP request 225 to be transmitted to the HTTP server 110, generate a new transaction identifier 226 and insert the generated transaction identifier 211 into an X-INFO header of the outgoing HTTP request 225, and forward the outgoing HTTP request 225 to the HTTP server 110.

The edge server 130 may further transmit a logging message 230 to the APM data source 170. The logging message 230 may comprise at least part of the outgoing HTTP request 225 transmitted by the edge server 130 to the HTTP server 110.

The HTTP server 110 may, upon parsing the incoming message 225, issue one or more requests 235 to one or more application servers 135. Responsive to determining that the incoming message 225 comprises a transaction identifier 226, the HTTP server 110 may insert the transaction identifier 226 into X-INFO headers of the one or more outgoing messages 235 associated with the incoming message 225, before forwarding the outgoing HTTP request to an application server 135.

The HTTP server 110 may further transmit a logging message 240 to the APM data source 170. The logging message 240 may comprise at least part of the incoming message 225 and/or at least part of the outgoing message 235.

The request processing by application server 135 may comprise issuing one or more requests 245 to one or more database servers 140. Responsive to determining that the incoming message 235 comprises a transaction identifier 226, the application server 135 may insert the transaction identifier into one or more outgoing messages 245 associated with the incoming message 235, before forwarding the outgoing messages 245 to a database server 140.

The application server 135 may further transmit a logging message 250 to the APM data source 170. The logging message 250 may comprise at least part of the incoming message 235 and/or at least part of the outgoing message 245.

Responsive to receiving the request 245, the database server 140 may produce a response message 255 to be transmitted to the requesting application server 135. The database server 140 may further transmit a logging message 260 to the APM data source 170. The logging message 260 may comprise at least part of the incoming message 245 and/or at least part of the outgoing message 255.

Responsive to receiving the database response message 255, the application server 135 may build a response message 265 to be transmitted to the HTTP server 110. The application server 135 may insert the transaction identifier 226 into X-INFO header of the response message 265, before forwarding the response message 265 to the HTTP server 110.

The application server 135 may further transmit a logging message 270 to the APM data source 170. The logging message 270 may comprise at least part of the incoming message 255 and/or at least part of the outgoing message 265.

The HTTP server 110 may then forward the response message 275 to the client computer system 125 (e.g., via an edge server 130). The HTTP server 110 may further transmit a logging message 280 to the APM data source 170.

The above described application performance monitoring methods serve as illustrative examples only and do not in any way limit the scope of the present disclosure. Various other APM systems and/or methods may be compatible with the methods and systems for providing transaction identifiers for application performance management in distributed computer systems described herein.

Figure 3:
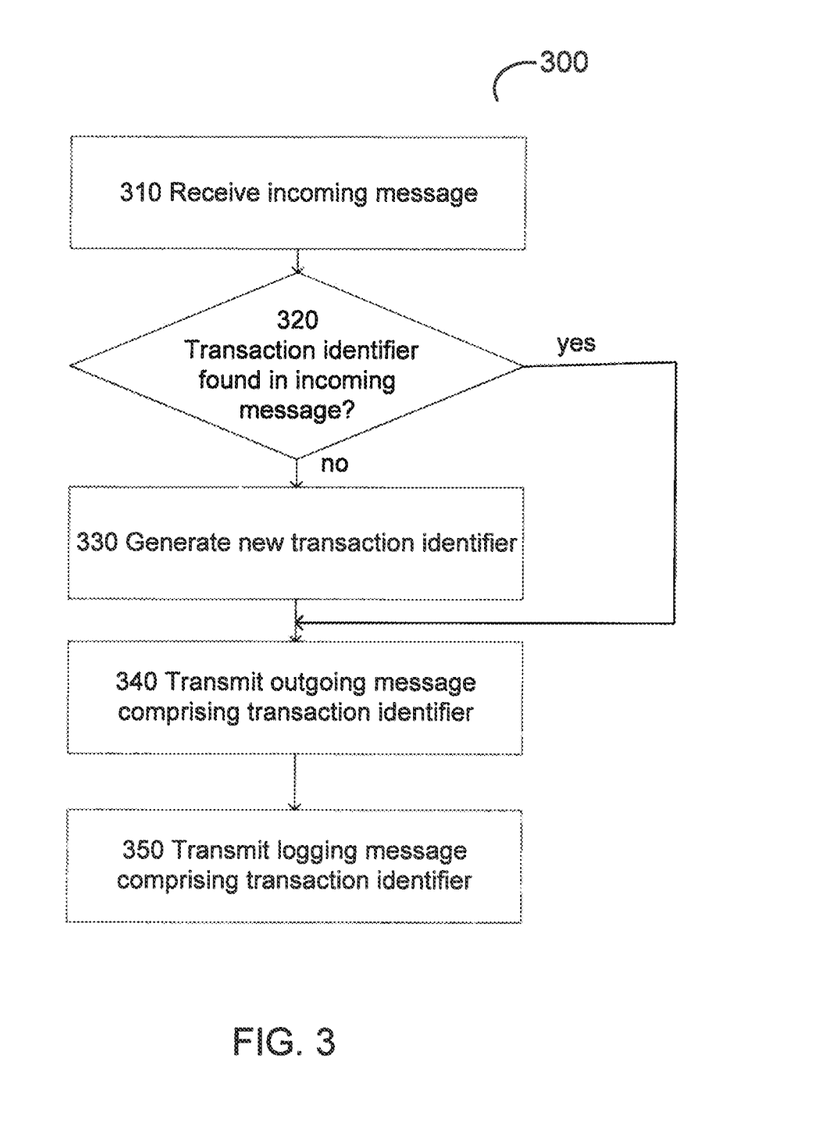
FIG. 3 depicts a flow diagram of an example method for providing transaction identifiers for application performance management in distributed computer systems, in accordance with one or more aspects of the present disclosure.

FIG. 3 depicts a flow diagram of an example method 300 for providing transaction identifiers for application performance management in distributed computer systems, in accordance with one or more aspects of the present disclosure. Method 300 and/or each of its individual functions, routines, subroutines, or operations may be performed by one or more general purpose and/or specialized processing devices. Two or more functions, routines, subroutines, or operations of method 300 may be performed in parallel or in an order that may differ from the order described above. In certain implementations, method 300 may be performed by a single processing thread. Alternatively, method 300 may be performed by two or more processing threads, each thread executing one or more individual functions, routines, subroutines, or operations of the method. In an illustrative example, the processing threads implementing method 300 may be synchronized (e.g., using semaphores, critical sections, and/or other thread synchronization mechanisms). Alternatively, the processing threads implementing method 300 may be executed asynchronously with respect to each other. In an illustrative example, method 300 may be performed by an example computer system 500 described herein below with references to FIG. 4.

Referring to FIG. 3, at block 310, the processing device implementing the method may receive an incoming message (e.g., an HTTP request message).

Responsive to ascertaining, at block 320, that an incoming message (e.g., an HTTP request) does not comprise a transaction identifier conforming to a pre-defined byte pattern (e.g., X-INFO HTTP header or a custom HTTP header), the processing device may, at block 330, generate a new transaction identifier. In certain implementations, the transaction identifier may be represented by a globally unique value (GUID). In an illustrative example, the transaction identifier may be represented by a combination of a GUID and a server identifier, the latter identifying the server that generated the transaction identifier. In another illustrative example, the transaction identifier may be represented by a combination of a GUID and one or more various other identifiers (e.g., a session identifier, a user identifier, etc.).

At block 340, the processing device may insert the incoming or newly generated transaction identifier into an outgoing message associated with the incoming message. In an illustrative example, an HTTP server may, responsive to receiving an HTTP request, build an HTTP response and insert the transaction identifier found in the HTTP request into an X-INFO header of the HTTP response, before transmitting the response back to the HTTP request originator. In another illustrative example, an HTTP server may, responsive to receiving an incoming HTTP request, build an outgoing HTTP request to be transmitted to an application server, and insert the transaction identifier found in the incoming HTTP request into an X-INFO header of the outgoing HTTP request, before forwarding the outgoing HTTP request to an application server.

At block 350, the processing device may transmit a message comprising a log record to an APM data source. The logging message may comprise the incoming or newly generated transaction identifier. In an illustrative example, the logging message may comprise one or more outgoing messages. In another illustrative example, the logging message may mirror an outgoing message. In another illustrative example, a separate logging message may be transmitted for each outgoing message. In another illustrative example, the logging message may comprise an incoming message and/or one or more outgoing messages. In another illustrative example, the logging message may comprise a subset of one or more outgoing messages. Responsive to completing operations referenced by the block 350, the method may terminate.

Figure 4:
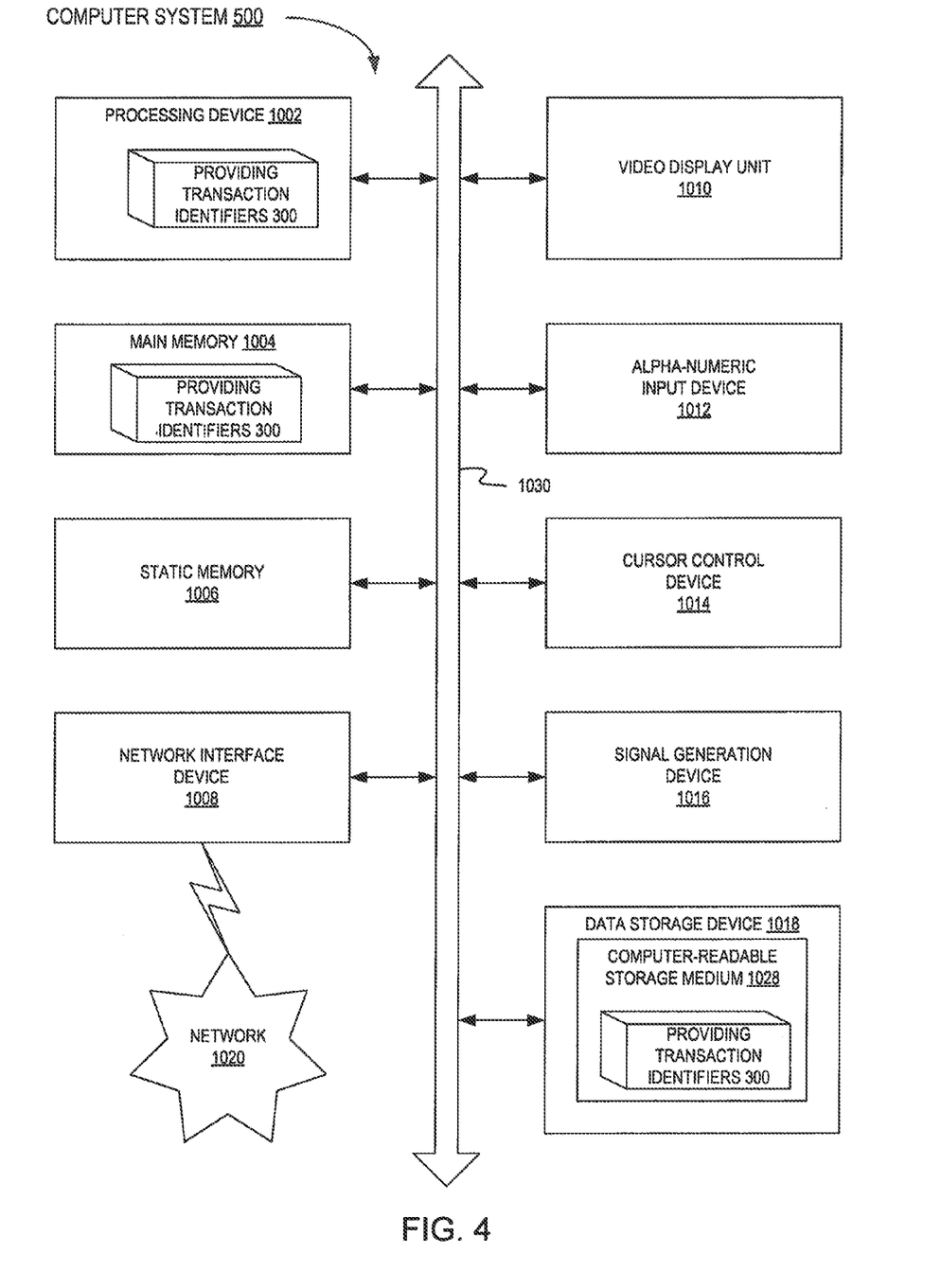
FIG. 4 depicts a block diagram of an illustrative computer system operating in accordance with one or more aspects of the present disclosure.

FIG. 4 illustrates a diagrammatic representation of a computer system 500 within which a set of instructions for causing the computing device to perform the methods discussed herein may be executed. The computer system 500 may be connected to other computing devices in a LAN, an intranet, an extranet, and/or the Internet. The computer system 500 may operate in the capacity of a server machine in client-server network environment. The computer system 500 may be provided by a personal computer (PC), a set-top box (STB), a server, a network router, switch or bridge, or any machine capable of executing a set of instructions (sequential or otherwise) that specify actions to be taken by that machine. Further, while only a single computing device is illustrated, the term "computer system" shall also be taken to include any collection of computing devices that individually or jointly execute a set (or multiple sets) of instructions to perform the methods discussed herein. In illustrative examples, the computer system 500 may implement the above described method 300 for providing transaction identifiers for application performance management in distributed computer systems.

The example computer system 500 may include a processing device (e.g., a general purpose processor) 1002, a main memory 1004 (e.g., synchronous dynamic random access memory (DRAM), read-only memory (ROM)), a static memory 1006 (e.g., flash memory and a data storage device 1018), which may communicate with each other via a bus 1030.

The processing device 1002 may be provided by one or more general-purpose processing devices such as a microprocessor, central processing unit, or the like. In an illustrative example, the processing device 1002 may comprise a complex instruction set computing (CISC) microprocessor, reduced instruction set computing (RISC) microprocessor, very long instruction word (VLIW) microprocessor, or a processor implementing other instruction sets or processors implementing a combination of instruction sets. The processing device 1002 may also comprise one or more special-purpose processing devices such as an application specific integrated circuit (ASIC), a field programmable gate array (FPGA), a digital signal processor (DSP), a network processor, or the like. The processing device 1002 may be configured to execute the method 300 for providing transaction identifiers for application performance management in distributed computer systems, in accordance with one or more aspects of the present disclosure.

The computer system 500 may further include a network interface device 1008, which may communicate with a network 1020. The computer system 500 also may include a video display unit 1010 (e.g., a liquid crystal display (LCD) or a cathode ray tube (CRT)), an alphanumeric input device 1012 (e.g., a keyboard), a cursor control device 1014 (e.g., a mouse) and an acoustic signal generation device 1016 (e.g., a speaker). In one embodiment, video display unit 1010, alphanumeric input device 1012, and cursor control device 1014 may be combined into a single component or device (e.g., an LCD touch screen).

The data storage device 1018 may include a computer-readable storage medium 1028 on which may be stored one or more sets of instructions (e.g., instructions of the method 300 for providing transaction identifiers for application performance management in distributed computer systems, in accordance with one or more aspects of the present disclosure) implementing any one or more of the methods or functions described herein. Instructions implementing the method 300 may also reside, completely or at least partially, within main memory 1004 and/or within processing device 1002 during execution thereof by computer system 500, main memory 1004 and processing device 1002 also constituting computer-readable media. The instructions may further be transmitted or received over a network 1020 via network interface device 1008.

While computer-readable storage medium 1028 is shown in an illustrative example to be a single medium, the term "computer-readable storage medium" should be taken to include a single medium or multiple media (e.g., a centralized or distributed database and/or associated caches and servers) that store one or more sets of instructions. The term "computer-readable storage medium" shall also be taken to include any medium that is capable of storing, encoding or carrying a set of instructions for execution by the machine and that cause the machine to perform the methods described herein. The term "computer-readable storage medium" shall accordingly be taken to include, but not be limited to, solid-state memories, optical media and magnetic media.

Unless specifically stated otherwise, terms such as "updating," "identifying," "determining," "sending," "assigning," or the like refer to actions and processes performed or implemented by computing devices that manipulate and transform data represented as physical (electronic) quantities within the computing device's registers and memories into other data similarly represented as physical quantities within the computing device memories or registers or other such information storage, transmission or display devices. Also, the terms "first," "second," "third," "fourth," etc. as used herein are meant as labels to distinguish among different elements and may not necessarily have an ordinal meaning according to their numerical designation.

Examples described herein also relate to an apparatus for performing the methods described herein. This apparatus may be specially constructed for the required purposes, or it may comprise a general purpose computing device selectively programmed by a computer program stored in the computing device. Such a computer program may be stored in a computer-readable non-transitory storage medium.

The methods and illustrative examples described herein are not inherently related to any particular computer or other apparatus. Various general purpose systems may be used in accordance with the teachings described herein, or it may prove convenient to construct more specialized apparatus to perform the required method steps. The required structure for a variety of these systems will appear as set forth in the description above.

The above description is intended to be illustrative, and not restrictive. Although the present disclosure has been described with references to specific illustrative examples, it will be recognized that the present disclosure is not limited to the examples described. The scope of the disclosure should be determined with reference to the following claims, along with the full scope of equivalents to which the claims are entitled.

What is claimed is:

1. A method, comprising:
receiving, by a first computer system of a distributed computer system, a first message associated with a transaction;
attempting to identify, based on a pre-defined byte pattern, an incoming transaction identifier within the first message;
responsive to failing to identify the incoming transaction identifier, generating a new transaction identifier, wherein the new transaction identifier comprises a global unique identifier (GUID) and a session identifier;
transmitting, to a second computer system, a second message associated with the transaction, the second message comprising a transaction identifier provided by one of: the incoming transaction identifier or the new transaction identifier; and
transmitting, to an application performance management (APM) system, a log record of the transaction, wherein the log record associates, based on the transaction identifier, the first message and the second message with the transaction, and wherein the APM system is configured to process data reflecting performance parameters of one or more applications being executed by the distributed computer system.

2. The method of claim 1, wherein at least one of the first computer system or the second computer system is provided by one of: an edge server, a Hypertext Transfer Protocol (HTTP) server, an application server, or a database server.

3. The method of claim 1, wherein the first message is provided by an HTTP request.

4. The method of claim 1, wherein the second message is provided by one of: an HTTP request or an HTTP response.

5. The method of claim 1, wherein the second message represents one of: a response to the first message or a request derived from the first message.

6. The method of claim 1, wherein the pre-defined byte pattern specifies an HTTP header.

7. A distributed computer system, comprising:
a first computer system comprising a first processing device and communicatively coupled to a first network;
a second computer system comprising a second processing device and communicatively coupled to the first computer system via a second network; and
an application performance management (APM) system comprising a third processing device and communicatively coupled to the first computer system via a third network;
wherein the first computer system is operable to:
receive, via the first network, a first message associated with a transaction;
attempt to identify, based on a pre-defined byte pattern, an incoming transaction identifier within the first message;
responsive to failing to identify the incoming transaction identifier, generate a new transaction identifier, wherein the new transaction identifier comprises a global unique identifier (GUID) and a session identifier;
transmit, to the second computer system, a second message associated with the transaction, the second message comprising a transaction identifier provided by one of: the incoming transaction identifier or the new transaction identifier; and
transmit, to the APM system, a log record of the transaction, wherein the log record associates, based on the transaction identifier, the first message and the second message with the transaction;
wherein the first message and the second message are associated with different Open Systems Interconnection (OSI) application layer protocols.

8. The distributed computer system of claim 7, wherein at least one of the first computer system or the second computer system is provided by one of: an edge server, a Hypertext Transfer Protocol (HTTP) server, an application server, or a database server.

9. The distributed computer system of claim 7, wherein the first message is provided by an HTTP request.

10. The distributed computer system of claim 7, wherein the second message is provided by one of: an HTTP request or an HTTP response.

11. The distributed computer system of claim 7, wherein the second message represents one of: a response to the first message or a request derived from the first message.

12. The distributed computer system of claim 7, wherein the pre-defined byte pattern specifies an HTTP header.

13. A computer-readable non-transitory storage medium comprising executable instructions that, when executed by a first computer system of a distributed computer system, cause the first computer system to perform operations comprising:
receiving a first message associated with a transaction;
attempting to identify, based on a pre-defined byte pattern, an incoming transaction identifier within the first message;
responsive to failing to identify the incoming transaction identifier, generating a new transaction identifier, wherein the new transaction identifier comprises a global unique identifier (GUID) and a session identifier;
transmitting, to a second computer system, a second message associated with the transaction, the second message comprising a transaction identifier provided by one of: the incoming transaction identifier or the new transaction identifier; and
transmitting, to an application performance management (APM) system, a log record of the transaction, wherein the log record associates, based on the transaction identifier, the first message and the second message with the transaction, and wherein the APM system is configured to process data reflecting performance parameters of one or more applications being executed by the distributed computer system.

14. The computer-readable non-transitory storage medium of claim 13, wherein at least one of the first computer system or the second computer system is provided by one of: an edge server, a Hypertext Transfer Protocol (HTTP) server, an application server, or a database server.

15. The computer-readable non-transitory storage medium of claim 13, wherein the first message is provided by an HTTP request.

16. The computer-readable non-transitory storage medium of claim 13, wherein the second message is provided by one of: an HTTP request or an HTTP response.

17. The computer-readable non-transitory storage medium of claim 13, wherein the second message represents one of: a response to the first message or a request derived from the first message.

* * * * *